April 5, 1927.
F. L. BROUSSOUSE
1,623,862
AUTOMATIC CLUTCH
Original Filed Jan. 6, 1923
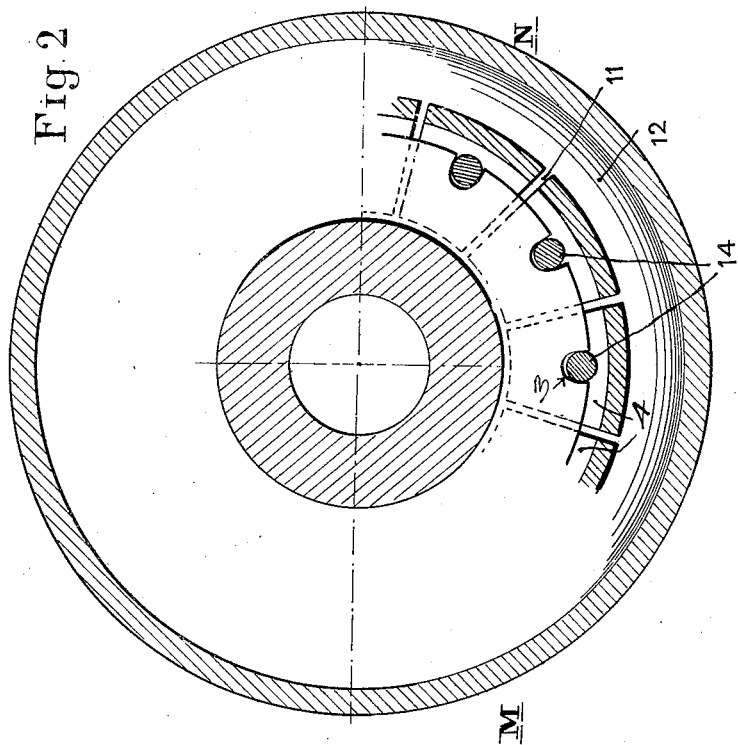
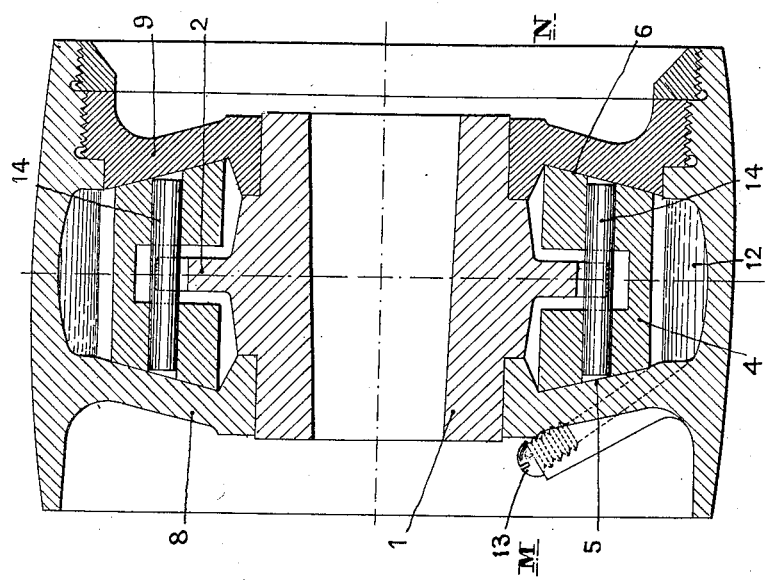
INVENTOR
FERNAND L. BROUSSOUSE
BY
ATTORNEYS Patented Apr. 5, 1927.

1,623,862

UNITED STATES PATENT OFFICE.

FERNAND LOUIS BROUSSOUSE, OF PARIS, FRANCE, ASSIGNOR TO PAUL JULES LE-BOUCHER, OF PARIS, FRANCE.

AUTOMATIC CLUTCH.

Original application filed January 6, 1923, Serial No. 611,150, and in France January 11, 1922. Divided and this application filed March 7, 1925. Serial No. 13,895.

The application is a division of my copending application for automatic clutches Ser. No. 611,150 filed January 6, 1923, and concerns more particularly a pulley containing the said clutch which is designed for the main purpose of obtaining a progressive automatic starting of a driven shaft, in spite of the instantaneous starting of the driving motor.

The operative pressure, which according to the said pending specification is given by the springs 10, may be obtained by any convenient means, and the present invention refers to a constructional form of the said clutch, in which the said pressure is given by centrifugal force.

I have shown on the accompanying drawings a constructional form of a belt pulley intended to be keyed on the shaft of a motor, for instance of an electric motor, and which is provided with the connection device according to my invention.

Fig. 1 is a longitudinal section of the pulley, and

Fig. 2 is a cross section.

In the said figures, the central hub 1 comprises a collar or flange 2 provided with notches such as 3, each of which controls, for instance by means of pins 14, a metallic sector, such as 4, the lateral faces of which are suitably inclined, as shown.

During the rotation of the shaft and of the hub 1, the sectors 4 are brought, under centrifugal force with their inclined faces 5, 6 respectively upon the pulley body 8 and the cover 9 of the same, and the slope of the said faces is such that the desired clutching effect is obtained at a given speed of the hub 1. It is to be understood that the hub 1 and the parts rigidly connected thereto or integral therewith constitute the drive member and that the pulley and its cover constitute the driven member.

In the said constructional form, as well as in the parent specification, oil is placed in cavity 12 so that when the pulley is at rest the level is regulated by the position of the filling hole 13, that is, the oil level attains to the line M—N. This assures that when the pulley does not rotate at its full speed as well as during the final phases of the stopping or during the initial phases of the starting, the friction surfaces are completely lubricated owing to the same passing through the oil contained in the pulley which at those times collects in the lower part of the oil chamber.

Upon starting and as the revolutions of the pulley approach and reach that of the hub, the oil by centrifugal force occupies the inner periphery of the chamber 12, thus constituting a liquid ring around the parts 4, so that the oil does not then contact with the friction surfaces 5, 6 of the sectors 4 and the corresponding surfaces of the body 8 and cover 9 of the pulley. The spaces 11 provided between the sectors 4 act in a similar manner to the radial slots provided in the discs referred to in the parent specification.

A progressiveness of clutching is thus obtained since as the speed increases the inclined faces 5 and 6 of the shoes or sectors 4 are more firmly pressed against the correspondingly inclined faces of the body 8 and its cover 9 under the action of centrifugal force and at the same time the oil is thrown out from between these engaging faces by centrifugal force to increase the coefficient of friction. On the other hand when the speed decreases below a predetermined value the oil flows back in between the engaging faces to decrease the coefficient of friction and the shoes are less forcibly urged outwardly.

What I claim is:

1. A clutch comprising a driving member, a driven member having means providing an oil chamber in its outer portion, and friction clutch shoes frictionally engageable with the driven member, and means for connecting the shoes to the driving member in such manner as to permit limited radial movement of the shoes relative to the driven member while affording a positive connection in respect of angular movements.

2. A clutch comprising a driving member, a driven member having side walls provided with outwardly converging inner faces, clutch shoes of segmental form and having inclined friction side faces frictionally engageable with the converging faces of the side walls, and means for positively connecting the shoes to the driving member while permitting limited radial movement, said driven member having an oil chamber between the outer portions of its converging side faces.

In testimony whereof I have hereunto set my hand at Paris this 20th day of February, 1925.

FERNAND LOUIS BROUSSOUSE.